United States Patent
Yokota et al.

(10) Patent No.: US 7,652,123 B2
(45) Date of Patent: Jan. 26, 2010

(54) METHOD FOR PRODUCING A HIGH QUALITY AROMATIC POLYCARBONATE

(75) Inventors: Koshiro Yokota, Tokyo (JP); Hiroshi Hachiya, Kurashiki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 415 days.

(21) Appl. No.: 10/593,479

(22) PCT Filed: Jun. 14, 2005

(86) PCT No.: PCT/JP2005/010865

§ 371 (c)(1),
(2), (4) Date: Sep. 20, 2006

(87) PCT Pub. No.: WO2005/121213

PCT Pub. Date: Dec. 22, 2005

(65) Prior Publication Data

US 2007/0197764 A1    Aug. 23, 2007

(30) Foreign Application Priority Data

Jun. 14, 2004 (JP) ............................. 2004-176207

(51) Int. Cl.
*C08G 64/00* (2006.01)
*C08G 63/02* (2006.01)

(52) U.S. Cl. ...................... 528/196; 264/349; 523/351; 525/462; 528/198

(58) Field of Classification Search ................ 264/349; 523/351; 525/462; 528/196, 198
See application file for complete search history.

(56) References Cited

U.S. PATENT DOCUMENTS

| 3,888,826 | A | | 6/1975 | Yamana et al. |
|---|---|---|---|---|
| 5,589,564 | A | | 12/1996 | Komiya et al. |
| 5,719,254 | A | * | 2/1998 | Hachiya et al. ............. 528/196 |
| 5,852,156 | A | * | 12/1998 | Hachiya et al. ............. 528/196 |
| 5,932,683 | A | * | 8/1999 | Hachiya et al. ............. 528/196 |
| 5,972,273 | A | * | 10/1999 | Hachiya ..................... 264/349 |

FOREIGN PATENT DOCUMENTS

| GB | 1007302 | | 10/1965 |
|---|---|---|---|
| JP | 48-8355 | | 2/1973 |
| JP | 52-36159 | | 3/1977 |
| JP | 57-2334 | A | 1/1982 |
| JP | 59-210938 | A | 11/1984 |
| JP | 60-169444 | A | 9/1985 |
| JP | 60-169445 | A | 9/1985 |
| JP | 2153923 | A | 6/1990 |
| JP | 2003-183379 | A | 7/2003 |
| JP | 2003-192782 | A | 7/2003 |
| JP | 2003-201343 | A | 7/2003 |
| WO | WO-95/03351 | A1 | 2/1995 |

OTHER PUBLICATIONS

Matsukane et al., "Purasuchikku Zairyo Koza [5]: Porikaaboneito Jushi (Lectures on Plastic Materials [5]: Polycarbonate Resin)", p. 62-67, Published by The Nikkan Kogyo Shimbun Ltd., Japan, (1969).

* cited by examiner

*Primary Examiner*—Terressa M Boykin
(74) *Attorney, Agent, or Firm*—Birch, Stewart, Kolasch & Birch, LLP

(57) ABSTRACT

A method for producing a high quality aromatic polycarbonate, which comprises subjecting to molten state polymerization a mixture of an aromatic dihydroxy compound and a diaryl carbonate in the presence of a catalyst, the mixture of the aromatic dihydroxy compound and the diaryl carbonate being obtained by a mixing step in which an aromatic dihydroxy compound and a catalyst, each being in a solid state and/or a liquid state, are added to a diaryl carbonate in a molten state in the presence of an inert gas, thereby dissolving the aromatic dihydroxy compound and the catalyst in the molten diaryl carbonate.

1 Claim, 1 Drawing Sheet

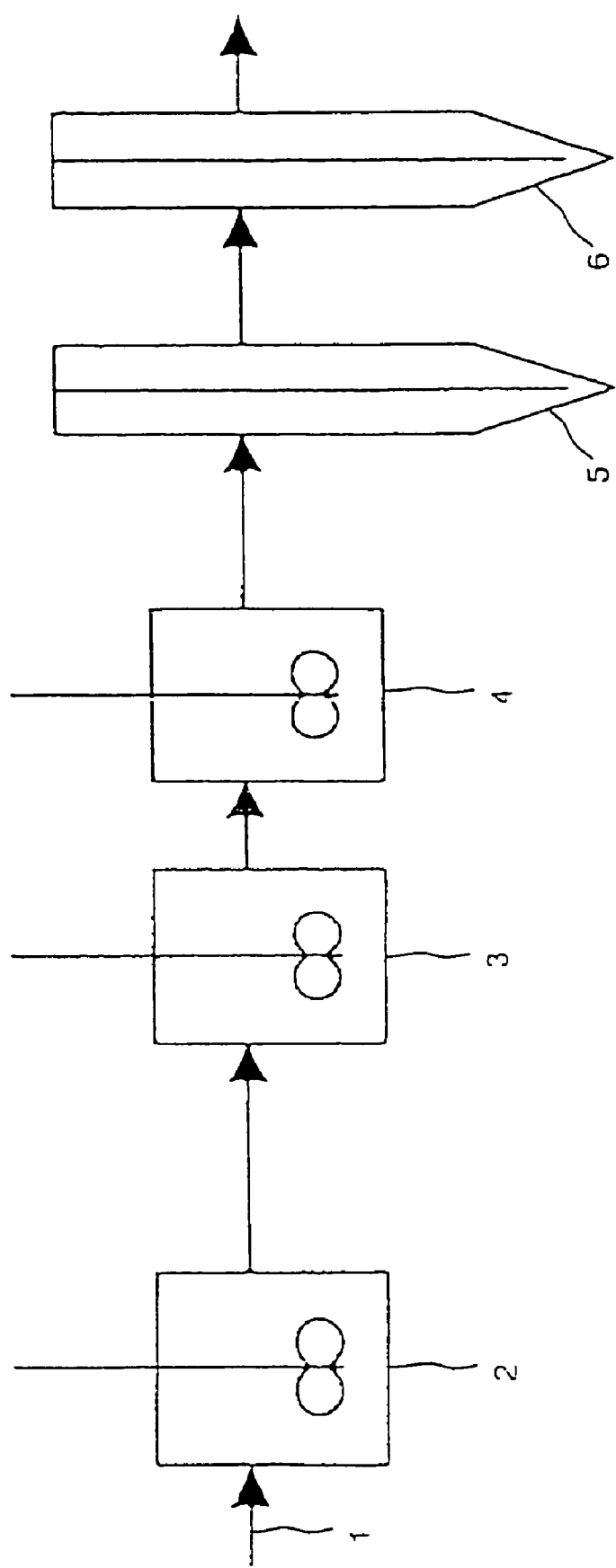

METHOD FOR PRODUCING A HIGH QUALITY AROMATIC POLYCARBONATE

FIELD OF THE INVENTION

The present invention relates to a method for producing a high quality aromatic polycarbonate. More specifically, the present invention is concerned with a method for producing an aromatic polycarbonate, which comprises subjecting to molten state polymerization a mixture of an aromatic dihydroxy compound and a diaryl carbonate in the presence of a catalyst, wherein the mixture of the aromatic dihydroxy compound and the diaryl carbonate is obtained by a mixing step in which an aromatic dihydroxy compound and a catalyst, each being in at least one state selected from the group consisting of a solid state and a liquid state, are added to a diaryl carbonate in a molten state in the presence of an inert gas, thereby dissolving the aromatic dihydroxy compound and the catalyst in the molten diaryl carbonate. By the method of the present invention, there can be efficiently produced a high quality aromatic polycarbonate which is free of discoloration and which exhibits only a small variation of both the terminal hydroxyl group ratio and the molecular weight.

BACKGROUND OF THE INVENTION

In recent years, aromatic polycarbonates have been widely used in various fields as engineering plastics having excellent properties with respect to heat resistance, impact resistance and transparency. With respect to methods for producing aromatic polycarbonates, various studies have heretofore been made. Of the methods studied, a process utilizing an interfacial polycondensation between an aromatic dihydroxy compound and phosgene has been commercially practiced, wherein 2,2-bis(4-hydroxyphenyl)propane (hereinafter, frequently referred to as "bisphenol A") can be mentioned as a representative example of the aromatic dihydroxy compound.

However, the interfacial polycondensation process has problems in that it is necessary to use phosgene, which is poisonous, that a reaction apparatus is likely to be corroded with chlorine-containing compounds, such as hydrogen chloride and sodium chloride, which are by-produced, and methylene chloride which is used as a solvent in a large quantity, and that difficulties are encountered in separating and removing impurities (such as sodium chloride) and residual methylene chloride, which adversely affect properties of a produced polymer.

For solving such problems, there have been proposed many methods in which, instead of phosgene, a dialkyl carbonate or a diaryl carbonate is used to produce an aromatic polycarbonate. Examples of methods in which a dialkyl carbonate is used to produce an aromatic polycarbonate include (i) a method in which a dialkyl carbonate and an aromatic dihydroxy compound are subjected to transesterification to thereby obtain an aromatic polycarbonate (see patent documents 1, 2 and 3), and (ii) a method in which a dialkyl carbonate and an aliphatic ester of an aromatic dihydroxy compound are subjected to transesterification to thereby obtain an aromatic polycarbonate (see patent document 4). In the case of a method using a dialkyl carbonate, during the reaction, a fraction containing an aliphatic monohydroxy compound or a derivative thereof and a dialkyl carbonate or the like is obtained from the reaction system and withdrawn as a column top distillate from a distillation column. Since such components of the column top distillate are usually liquid at room temperature, it is easy to handle the components, as compared to the case of the methods using a diaryl carbonate. However, the method (i) above has a defect in that the reaction rate is low and, hence, it is difficult to obtain a high molecular weight polymer, and the method (ii) above has problems not only in that an unstable and toxic substance, such as ketene, is byproduced in the production of the raw material, but also in that the procedure of the method (ii) is complicated, thus rendering the method (ii) unsatisfactory for use as a commercial process. Further, the methods using a dialkyl carbonate pose a quality problem in that the aromatic polycarbonate produced has a terminal alkyl carbonate group, and such aromatic polycarbonate has poor heat stability.

A method for producing an aromatic polycarbonate from an aromatic dihydroxy compound and a diaryl carbonate by transesterification has conventionally been known. For example, an aromatic polycarbonate can be produced by performing a molten state polymerization between bisphenol A and diphenyl carbonate. In this method, for achieving a high degree of polymerization with respect to a polycarbonate produced, it is necessary to remove by distillation an aromatic monohydroxy compound (such as phenol or the like) from a molten polycarbonate having high viscosity. This method has defects, for example, in that (1) since the polymerization is performed at a high temperature, branching and crosslinking are likely to occur due to side reactions, thus rendering it difficult to obtain a high quality polymer, and that (2) discoloration cannot be prevented (see non-patent document 1).

For overcoming these defects, many proposals on catalysts, stabilizers, polymerization methods and the like have been made. For example, in patent document 5, the present inventors disclosed a method in which a molten mixture of an aromatic dihydroxy compound and a diaryl carbonate or a prepolymer obtained by reacting an aromatic dihydroxy compound with a diaryl carbonate is subjected to free-fall polymerization in which the prepolymer or molten mixture is allowed to fall freely, thereby effecting a polymerization during the free fall. By this method, a high quality polycarbonate having no discoloration can be produced.

The properties of a resin, such as color, are expressed by a wide variety of indexes. However, the basic properties of a resin (such as viscosity) are likely to depend on the molecular weight of the resin. Therefore, it is an important task to develop a technology which is useful for efficiently producing a resin having a desired molecular weight. In addition, a resin has also properties (such as moldability and heat resistance) which are greatly influenced not only by the molecular weight but also by, e.g., the ratio of terminal hydroxyl groups. For this reason, it is also an important task to establish a method which is useful for stably controlling the terminal hydroxyl group ratio of a resin.

In the case where an aromatic dihydroxy compound and a diaryl carbonate are subjected to molten state polymerization, for the purpose of realizing a resin having such desired properties as a stable molecular weight, a stable ratio of terminal hydroxyl groups, and freedom of discoloration, it is especially important to provide a stable molar ratio of an aromatic dihydroxy compound and a diaryl carbonate. Therefore, it has conventionally been attempted to develop a technology to stabilize the molar ratio of an aromatic dihydroxy compound and a diaryl carbonate (see patent documents 6, 7 and 8). However, no satisfactory technology has been obtained. Therefore, it has been desired to further improve the technology to stabilize the molar ratio of an aromatic dihydroxy compound and a diaryl carbonate.

[patent document 1] Unexamined Japanese Patent Application Laid-Open Specification No. Sho 57-2334

[patent document 2] Unexamined Japanese Patent Application Laid-Open Specification No. Sho 60-169444

[patent document 3] Unexamined Japanese Patent Application Laid-Open Specification No. Sho 60-169445

[patent document 4] Unexamined Japanese Patent Application Laid-Open Specification No. Sho 59-210938

[non-patent document 1] "Purasuchikku Zairyo Koza [5]: Porikaaboneito Jushi (Lectures on Plastic Materials [5]: Polycarbonate Resin)", written by Mikio MATSUKANE et al., p. 62 to 67, published in 1969 by The Nikkan Kogyo Shimbun Ltd, Japan

[patent document 5] International Publication No. WO95/03351

[patent document 6] Unexamined Japanese Patent Application Laid-Open Specification No. 2003-183379

[patent document 7] Unexamined Japanese Patent Application Laid-Open Specification No. 2003-201343

[patent document 8] Unexamined Japanese Patent Application Laid-Open Specification No. 2003-192782

DISCLOSURE OF THE INVENTION

Problems to be Solved by the Invention

A task of the present invention is to provide a method for efficiently producing a high quality aromatic polycarbonate which is free of discoloration and which exhibits only a small variation of both the terminal hydroxyl group ratio and the molecular weight.

Means to Solve the Problems

The present inventors have made extensive and intensive studies with a view toward solving the above-mentioned problems accompanying the prior art. As a result, it has unexpectedly been found that not only is it desired to perform the reaction while stabilizing the molar ratio of an aromatic dihydroxy compound and a diaryl carbonate, but also the order and timing of mixing together an aromatic dihydroxy compound, a diaryl carbonate and a polymerization catalyst are important. The present invention has been completed based on this novel finding.

Therefore, an object of the present invention is to provide a method for efficiently producing a high quality aromatic polycarbonate which is free of discoloration and which exhibits only a small variation of both the terminal hydroxyl group ratio and the molecular weight.

The foregoing and other objects, features and advantages of the present invention will be apparent from the following description taken in connection with the accompanying drawings, and the appended claims.

Effect of the Invention

According to the present invention, it is possible to efficiently produce a high quality aromatic polycarbonate which is free of discoloration and which exhibits only a small variation of both the terminal hydroxyl group ratio and the molecular weight.

BRIEF DESCRIPTION OF THE DRAWING

[FIG. 1] A schematic diagram showing the system used in Example 1.

DESCRIPTION OF THE REFERENCE NUMERALS

1: Raw materials
2: Mixing vessel
3: First agitation type polymerizer
4: Second agitation type polymerizer
5: First wire-wetting fall polymerizer
6: Second wire-wetting fall polymerizer

BEST MODE FOR CARRYING OUT THE INVENTION

According to the present invention, there is provided a method for producing a high quality aromatic polycarbonate, which comprises subjecting to molten state polymerization a mixture of an aromatic dihydroxy compound and a diaryl carbonate in the presence of a catalyst, the mixture of the aromatic dihydroxy compound and the diaryl carbonate being obtained by a mixing step in which an aromatic dihydroxy compound and a catalyst, each being in at least one state selected from the group consisting of a solid state and a liquid state, are added to a diaryl carbonate in a molten state in the presence of an inert gas, thereby dissolving the aromatic dihydroxy compound and the catalyst in the molten diaryl carbonate.

For easier understanding of the present invention, the essential features and various preferred embodiments of the present invention are enumerated below.

1. A method for producing a high quality aromatic polycarbonate, which comprises subjecting to molten state polymerization a mixture of an aromatic dihydroxy compound and a diaryl carbonate in the presence of a catalyst,
the mixture of the aromatic dihydroxy compound and the diaryl carbonate being obtained by a mixing step in which an aromatic dihydroxy compound and a catalyst, each being in at least one state selected from the group consisting of a solid state and a liquid state, are added to a diaryl carbonate in a molten state in the presence of an inert gas, thereby dissolving the aromatic dihydroxy compound and the catalyst in the molten diaryl carbonate.

2. The method according to item 1 above, wherein the mixing step is performed in which the molar ratio of the diaryl carbonate to the aromatic dihydroxy compound is in the range of from 1.05 to 1.20, wherein the molar ratio has a tolerable variation in the range of ±0.005.

3. The method according to item 2 above, wherein the mixing in the mixing step is accompanied by a transesterification reaction between the aromatic dihydroxy compound and the diaryl carbonate, wherein the conversion of the aromatic dihydroxy compound is from 10 to 80%.

4. The method according to any one of items 1 to 3 above, wherein the mixing step is performed at a temperature of from 80 to 250° C.

5. The method according to any one of items 1 to 4 above, wherein, before the mixing step, the aromatic dihydroxy compound is treated with an inert gas having an oxygen concentration of not more than 10 ppm.

6. The method according to any one of items 1 to 4 above, wherein the inert gas in the presence of which the mixing step is performed has an oxygen concentration of not more than 10 ppm.

Hereinbelow, the present invention is described in detail.

In the present invention, the terminology "aromatic dihydroxy compound" means a compound represented by the following formula:

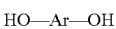

wherein Ar represents a divalent aromatic group.

Preferred examples of divalent aromatic groups (Ar groups) include a group represented by the following formula:

$$—Ar^1—Y—Ar^2—$$

wherein each of $Ar^1$ and $Ar^2$ independently represents a divalent carbocyclic or heterocyclic aromatic group having 5 to 70 carbon atoms, and Y represents a divalent alkane group having 1 to 30 carbon atoms.

In the divalent carbocyclic or heterocyclic aromatic groups $Ar^1$ and $Ar^2$, at least one hydrogen atom may be replaced by a substituent which does not adversely affect the reaction, such as a substituent selected from the group consisting of a halogen atom, an alkyl group having 1 to 10 carbon atoms, an alkoxy group having 1 to 10 carbon atoms, a phenyl group, a phenoxy group, a vinyl group, a cyano group, an ester group, an amide group and a nitro group.

Preferred examples of heterocyclic aromatic groups $Ar^1$ and $Ar^2$ include an aromatic group having at least one heteroatom, such as a nitrogen atom, an oxygen atom or a sulfur atom.

Examples of divalent aromatic groups $Ar^1$ and $Ar^2$ include an unsubstituted or substituted phenylene group, an unsubstituted or substituted biphenylene group and an unsubstituted or substituted pyridylene group. Substituents for $Ar^1$ and $Ar^2$ are as described above.

Examples of divalent alkane groups (Y groups) include organic groups respectively represented by the following formulae (1):

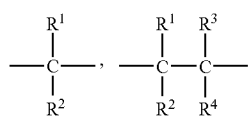

(1)

wherein each of $R^1$, $R^2$, $R^3$ and $R^4$ independently represents a hydrogen atom, an alkyl group having 1 to 10 carbon atoms, an alkoxy group having 1 to 10 carbon atoms, a cycloalkyl group having 5 to 10 ring-forming carbon atoms, a carbocyclic aromatic group having 5 to 10 ring-forming carbon atoms or a carbocyclic aralkyl group having 6 to 10 ring-forming carbon atoms; k represents an integer of from 3 to 11; each X represents a carbon atom and has $R^5$ and $R^6$ bonded thereto; each $R^5$ independently represents a hydrogen atom or an alkyl group having 1 to 6 carbon atoms, and each $R^6$ independently represents a hydrogen atom or an alkyl group having 1 to 6 carbon atoms, wherein $R^5$ and $R^6$ are the same or different; and wherein, in each of $R^1$, $R^2$, $R^3$, $R^4$, $R^5$ and $R^6$, at least one hydrogen atom may be replaced by a substituent which does not adversely affect the reaction, such as a substituent selected from the group consisting of a halogen atom, an alkyl group having 1 to 10 carbon atoms, an alkoxy group having 1 to 10 carbon atoms, a phenyl group, a phenoxy group, a vinyl group, a cyano group, an ester group, an amide group and a nitro group.

Specific examples of divalent aromatic groups (Ar groups) include groups respectively represented by the following formulae (2):

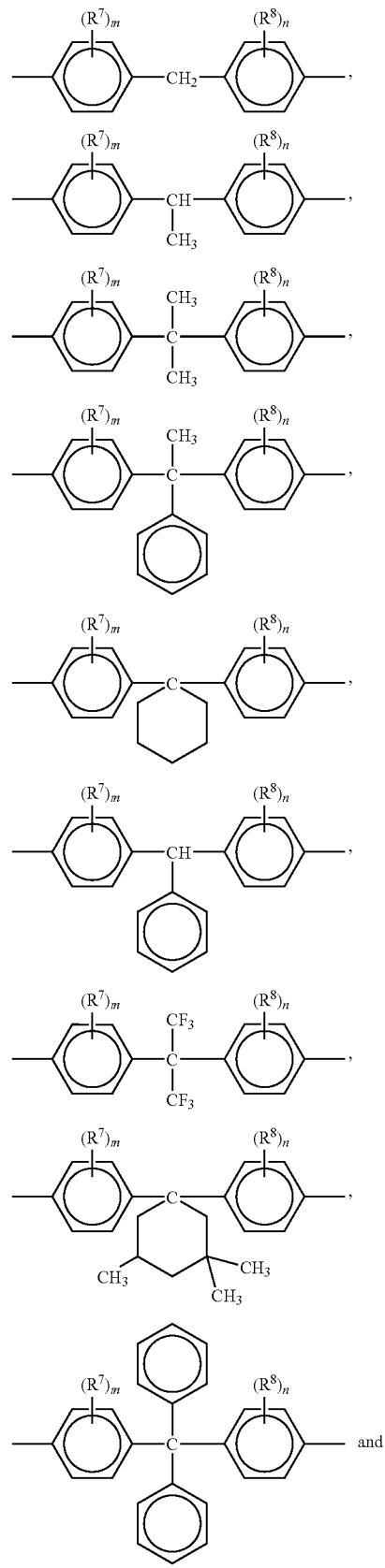

(2)

-continued

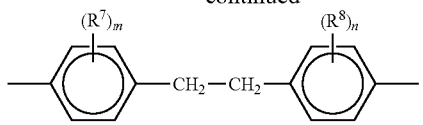

wherein each of R⁷ and R⁸ independently represents a hydrogen atom, a halogen atom, an alkyl group having 1 to 10 carbon atoms, an alkoxy group having 1 to 10 carbon atoms, a cycloalkyl group having 5 to 10 ring-forming carbon atoms, or a phenyl group; each of m and n independently represents an integer of from 1 to 4, with the proviso that when m is an integer of from 2 to 4, the R⁷'s are the same or different, and when n is an integer of from 2 to 4, the R⁸'s are the same or different.

Further examples of divalent aromatic groups (Ar groups) include a group represented by the following formula:

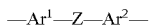

wherein Ar¹ and Ar² are as defined above; and

Z represents a single bond or a divalent group, such as —O—, —CO—, —S—, —SO₂, —SO—, —COO—, or —CON(R¹)—, wherein R¹ is as defined above.

Specific examples of such divalent aromatic groups (Ar groups) include groups respectively represented by the following formulae (3):

used in a liquid state, it is preferred that the aromatic dihydroxy compound is in a molten state.

The aromatic dihydroxy compounds can be used individually or in combination. However, it is necessary that the aromatic dihydroxy compounds can be used in common among the aromatic polycarbonates which are produced by the method of the present invention. Since a bisphenol A polycarbonate is currently prevailed, it is preferred to use bisphenol A individually.

The diaryl carbonate used in the present invention is represented by the following formula (4):

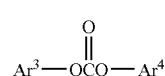

wherein each of Ar³ and Ar⁴ independently represents a monovalent aromatic group.

In each of Ar³ and Ar⁴, which independently represents a monovalent carbocyclic or heterocyclic aromatic group, at least one hydrogen atom may be replaced by a substituent which does not adversely affect the reaction, such as a substituent selected from the group consisting of a halogen atom, an alkyl group having 1 to 10 carbon atoms, an alkoxy group having 1 to 10 carbon atoms, a phenyl group, a phenoxy

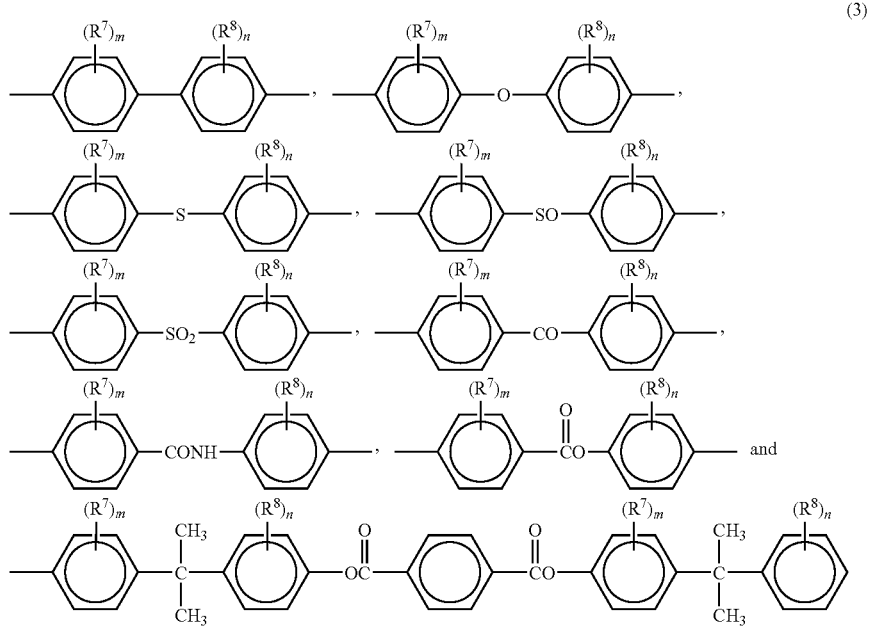

wherein R⁷, R⁸, m and n are as defined above.

Further examples of divalent aromatic groups (Ar groups) include an unsubstituted or substituted phenylene, an unsubstituted or substituted naphthylene, and an unsubstituted or substituted pyridylene. Substituents used here are as defined above.

In the method of the present invention, an aromatic dihydroxy compound may be in a solid state or in a liquid state. When used in a solid state, it is preferred that the aromatic dihydroxy compound is in the form of flake or prill. When group, a vinyl group, a cyano group, an ester group, an amide group and a nitro group. Ar³ and Ar⁴ are the same or different.

Representative examples of monovalent aromatic groups Ar³ and Ar⁴ include a phenyl group, a naphthyl group, a biphenyl group and a pyridyl group. These groups may or may not be substituted with the above-mentioned substituent or substituents.

Preferred examples of monovalent aromatic groups Ar³ and Ar⁴ include those which are respectively represented by the following formulae (5):

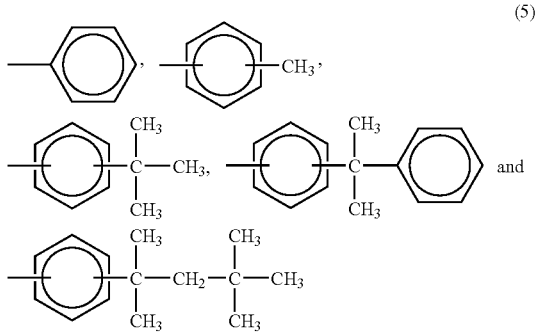

Representative examples of diaryl carbonates include a unsubstituted or substituted diphenyl carbonate compound represented by the following formula (6):

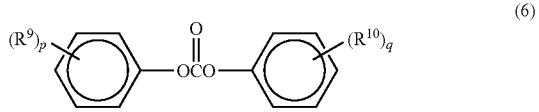

wherein each of $R^9$ and $R^{10}$ independently represents a hydrogen atom, an alkyl group having 1 to 10 carbon atoms, an alkoxy group having 1 to 10 carbon atoms, a cycloalkyl group having 5 to 10 ring-forming carbon atoms or a phenyl group; each of p and q independently represents an integer of from 1 to 5, with the proviso that when p is an integer of 2 or more, the $R^9$'s are the same or different, and when q is an integer of 2 or more, the $R^{10}$'s are the same or different.

Of these diaryl carbonates, preferred are diaryl carbonates having a symmetrical configuration, such as (unsubstituted) diphenyl carbonate and a diphenyl carbonate substituted with a lower alkyl group, e.g., ditolyl carbonate and di-tert-butylphenyl carbonate. Especially preferred is unsubstituted diphenyl carbonate, which is the diaryl carbonate having the simplest structure.

These diaryl carbonates can be used individually or in combination.

In the present invention, the ratio in which the aromatic dihydroxy compound and the diaryl carbonate are used (i.e., a charging ratio) may vary depending on the desired range of the molecular weight or the terminal hydroxyl group ratio of the aromatic polycarbonate, the types of the aromatic dihydroxy compound and diaryl carbonate employed, the polymerization conditions (such as a polymerization temperature) and the like. The diaryl carbonate is used in an amount of preferably from 1.05 to 1.20 mole per mole of the aromatic dihydroxy compound.

It is preferred that the tolerable variation of the above-mentioned molar ratio is in the range of ±0.005.

When the variation of the molar ratio falls outside of the range of ±0.005, disadvantages tend to occur in that the variation of the molecular weight or terminal hydroxyl group ratio becomes large or in that the polymerization time needed to achieve a desired molecular weight becomes prolonged.

The variation of the above-mentioned molar ratio can be controlled by conventional methods. A preferred example of such a conventional method is a method in which diphenyl carbonate (melting point: about 80° C.) is heated to about 100° C. to thereby liquefy the diphenyl carbonate and, then, weighed in a liquid state using a mass flowmeter. Commercially available weighing apparatuses can be used. However, since accurate weighing is essential to this invention, it is desirable to use a weighing apparatus wherein the margin of error is within ±0.5%, preferably within ±0.25%.

On the other hand, as compared to the weighing of a diaryl carbonate, weighing of an aromatic dihydroxy compound is difficult, because an aromatic dihydroxy compound is usually shipped in the form of flake or prill, and when handled, particles of aromatic dihydroxy compound inevitably remain in a hopper or a storage tank. However, practical weighing of an aromatic dihydroxy compound, which is preferred in a plant operation, can be performed employing, for example, any of the following methods: a method in which the amount of an aromatic dihydroxy compound introduced into a storage tank is determined from the difference in the weight of the tank as between before and after the introduction of the aromatic dihydroxy compound thereinto, and a method in which weighing is performed by a load cell weighing apparatus.

It is preferred that an aromatic dihydroxy compound is used in a liquid form, because a liquid form of aromatic dihydroxy compound can be precisely, directly weighed, or can be precisely measured by volume, followed by determination of the weight by using the specific gravity thereof measured in advance.

Further, in an operation on a laboratory scale, it is preferred that an aromatic dihydroxy compound is handled, for example, in a dry box (which is usually used when handling an organometal complex) while constantly circulating nitrogen in the box. It is preferred that, before the nitrogen supplied from a liquid nitrogen cylinder is circulated in the dry box, the nitrogen is flowed through a deoxidizing tower, such as Large Oxygen Trap (trade name; manufactured and sold by GL Sciences Inc., Japan) and a dehydrating tower which is filled with calcium hydroxide or phosphorus penta-oxide, to thereby effect deoxidization and dehydration of the nitrogen constantly.

As a preferred example of a method for weighing an aromatic dihydroxy compound, there can also be mentioned a method in which about 98% of the necessary amount of an aromatic dihydroxy compound is roughly weighed and introduced into a storage tank, and the accurate amount of the aromatic dihydroxy compound in the tank is determined, to thereby accurately determine the shortage, whereupon the accurate amount of the aromatic dihydroxy compound which is necessary to make up the shortage is accurately weighed using a high precision weighing apparatus and added to the storage tank to thereby accurately make up the shortage.

One important requirement of the present invention is the order of mixing of an aromatic dihydroxy compound, a diaryl carbonate and a catalyst.

In the present invention, it is important that an aromatic dihydroxy compound and a catalyst, each being in a solid state and/or a liquid state, are dissolved in a diaryl carbonate in a molten state.

When the mixture of the aromatic dihydroxy compound and the diaryl carbonate is obtained by adding the diaryl carbonate in a molten state to the aromatic dihydroxy compound in a solid state, problems arise in that the obtained aromatic polycarbonate is discolored and the variation of the terminal hydroxyl group ratio of the aromatic polycarbonate becomes large.

Further, when the mixture of the aromatic dihydroxy compound and the diaryl carbonate is obtained by adding the diaryl carbonate in a molten state to the aromatic dihydroxy compound in a liquid state, a problem arises in that the obtained aromatic polycarbonate is discolored.

Furthermore, when the catalyst is added to a mixture of the aromatic dihydroxy compound and the diaryl carbonate, problems arise in that the molecular weight distribution of the aromatic polycarbonate becomes broad, a mold deposit tends to occur at the time of injection molding, and a gel-like high molecular weight polymer which decreases the transparency of a resin is produced.

The addition of the aromatic dihydroxy compound and the catalyst to the diaryl carbonate in a molten state may be performed through separate inlets at the same time. Further, the addition may be made by an operation in which a mixture of the aromatic dihydroxy compound and the catalyst is first obtained, the obtained mixture is added to the diaryl carbonate in a molten state.

It is required that the addition of the aromatic dihydroxy compound and the catalyst to the diaryl carbonate in a molten state be performed in the presence of an inert gas. This is also an important requirement of the present invention.

Examples of inert gases which do not adversely affect the polymerization reaction include nitrogen gas, carbon dioxide gas, rare gases (such as argon gas and helium gas) and a lower hydrocarbon gas. As an inert gas, nitrogen gas is preferred since nitrogen gas can be easily commercially obtained in a large amount.

It is preferred that the oxygen concentration of the inert gas is not more than 10 ppm, more advantageously not more than 3 ppm, still more advantageously not more than 1 ppm.

Nitrogen gas which is commercially available is generally obtained by subjecting air to low temperature separation. Such nitrogen gas has an oxygen concentration of not more than 10 ppm and, hence, such nitrogen gas is preferred in the present invention.

The pressure in the mixing vessel is selected from the group consisting of reduced pressure, atmospheric pressure and slightly superatmospheric pressure. When reduced pressure is employed, the polymerization reaction can be promoted at least to some extent by removing an aromatic monohydroxy compound byproduced during the polymerization reaction at the time of the mixing and/or the stirring thereafter. When atmospheric pressure is employed, the mixing step can be performed by commercially advantageous simple equipment. When slightly superatmospheric pressure is employed, entry of a trace amount of air into the mixing vessel can be prevented, thereby rendering it easy to satisfy the requirement that the mixing step be performed in the presence of an inert gas.

As described above, when the mixing step is accompanied by a transesterification reaction, the polymerization reaction can be promoted at least to some extent. Further, it is preferred that the transesterification reaction in the mixing step is fully performed to a desired extent by prolonging the stirring time in the mixing step to obtain a molten mixture of an aromatic dihydroxy compound and a diaryl carbonate and, then, the obtained mixture is sent to a subsequent polymerization step.

In such case, as may be expected, it is preferred that the transesterification reaction is not simply promoted without a specific goal, but the transesterification reaction is positively promoted so as to achieve a conversion close to the equilibrium conversion of a raw material used for the transesterification reaction, the equilibrium conversion being calculated from the reaction conditions employed in the mixing step, such as the temperature and the pressure. The preferred conversion of, e.g., the aromatic dihydroxy compound in the mixing step varies depending on the operation conditions in the mixing step. However, it is preferred that the conversion of the aromatic dihydroxy compound in the mixing step is from 10% to 80%. For example, when the mixing step is performed under conditions wherein the temperature is 140° C., the pressure is atmospheric pressure, the molar ratio of diphenyl carbonate to bisphenol A is 1.10, and a closed reaction system is used, the equilibrium conversion of bisphenol A is about 30%. In such case, from the experience of the present inventors, it is expected that, by several hours of stirring, the transesterification reaction can be caused to proceed to a conversion close to the equilibrium conversion (about 30%) of the aromatic dihydroxy compound.

The mixing vessel or storage vessels containing the aromatic dihydroxy compound and diaryl carbonate as raw materials are preferably degassed to a vacuum and, then, purged with an inert gas, such as nitrogen gas. Further, it is also preferred that at least one compound selected from the group consisting of the aromatic dihydroxy compound and diaryl carbonate is handled in a molten state so as to perform handling in the absence of oxygen. Especially, when a plant for producing the aromatic dihydroxy compound and/or a plant for producing diaryl carbonate is positioned adjacent to a plant for practicing the method of the present invention, these plants for producing the raw materials are preferably connected to the plant for practicing the method of the present invention, for example with a pipeline, to transfer the raw materials directly to a mixing vessel used in the method of the present invention. Further, a filter may be provided in a pipe connecting the mixing vessel to a reactor used after the mixing step.

In general, the aromatic dihydroxy compound is shipped in the form of a powder and, hence, air is adsorbed on the surfaces of the powder particles. Through their studies, the present inventors have found that such adsorbed air present in a powder of aromatic dihydroxy compound cannot be completely removed from the powder by simply flowing nitrogen gas into a storage vessel containing the powder of aromatic dihydroxy compound.

Therefore, in the present invention, the term "treatment with an inert gas" does not mean an easy and passive operation in which an inert gas is simply circulated in a storage vessel containing an aromatic dihydroxy compound or a diaryl carbonate, or in which an aromatic dihydroxy compound or a diaryl carbonate is simply allowed to stand still under a flow of an inert gas; but rather, the term "treatment with an inert gas" means an active operation for removing air which is hard to remove, e.g., air adsorbed on the aromatic dihydroxy compound or diaryl carbonate. An example of "treatment with an inert gas" is an operation in which a storage vessel containing an aromatic dihydroxy compound or a diaryl carbonate is firstly vacuum-degassed and then purged with nitrogen gas, wherein such an operation is repeated at least once, preferably a plurality of times.

With respect to the preservation of an aromatic dihydroxy compound and a diaryl carbonate, each of which has been treated with an inert gas, it is preferred that such compound is preserved in a storage vessel which is sealedly filled with nitrogen gas or in a storage vessel in which nitrogen gas is circulated.

In the method of the present invention, it is also preferred that the inert gas in the presence of which the mixing step is performed has an oxygen concentration of not more than 10 ppm.

In the method of the present invention, the term "the inert gas in the presence of which the mixing step is performed" encompasses not only an inert gas present as the gaseous phase in a mixing vessel or a storage vessel, but also a gas which is incidentally introduced into a mixing vessel in the form of a gas dissolved in or adsorbed on a diaryl carbonate or an aromatic dihydroxy compound charged into the mixing vessel. Therefore, before performing the mixing step, it is preferred that a gas dissolved in or adsorbed on a diaryl carbonate or an aromatic dihydroxy compound charged into the mixing vessel is purged with an inert gas or removed in vacuo. In the method of the present invention, the operation of repeating the abovementioned cycle of vacuum-degassing and purging with nitrogen gas is preferred also in this respect.

Such an operation in which an inert gas, e.g., nitrogen gas, is constantly blown into a storage vessel in order to cause the atmosphere in the storage vessel to maintain its oxygen concentration at an extremely low level, is generally, preferably used in the art and is also preferred in the method of the present invention. The inert gas constantly blown into a storage vessel in this method is also regarded as "the inert gas in the presence of which the mixing step is performed". Therefore, in the method of the present invention, it is also preferred to constantly blow into a storage vessel an inert gas having an oxygen concentration of not more than 10 ppm.

In the method of the present invention, with respect to the temperature at which an aromatic dihydroxy compound and a catalyst are dissolved in a diaryl carbonate in a molten state, there is no particular limitation as long as the resultant mixture is maintained in a uniformly molten state; however, the upper limit of the temperature is generally 250° C., preferably 200° C., more preferably 180° C. On the other hand, the lower limit of the temperature is generally 80° C., preferably 100° C., more preferably 120° C.

When the above-mentioned temperature (at which an aromatic dihydroxy compound and a catalyst are dissolved in a diaryl carbonate in a molten state) is higher than 250° C., a problem arises in that the aromatic polycarbonate obtained is most likely to exhibit marked occurrence of discoloration, which is probably due to the occurrence of a thermal degradation of diaryl carbonate. On the other hand, when the temperature is lower than 80° C., a problem arises in that the aromatic dihydroxy compound is likely to have no ability to be dissolved in the diaryl carbonate in a molten state.

With respect to the catalyst, there is no particular limitation as long as the catalyst is conventionally used in the art. Examples of catalysts include: hydroxides of an alkali metal and of an alkaline earth metal, such as lithium hydroxide, sodium hydroxide, potassium hydroxide and calcium hydroxide; alkali metal salts of, alkaline earth metal salts of and quaternary ammonium salts of boron hydride and of aluminum hydride, such as lithium aluminum hydride, sodium borohydride and tetramethylammonium borohydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO—Ar—OLi wherein Ar represents an aryl group, and NaO—Ar—ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^1R^2R^3R^4)NB(R^1R^2R^3R^4)$ wherein $R^1$, $R^2$, $R^3$ and $R^4$ are as defined for formulae (1) above, such as tetramethylammonium borohydride, tetrabutylammonium borohydride, tetrabutylammonium tetraphenylborate, tetramethylammonium tetraphenylborate, and phosphonium borates represented by the formula: $(R^1R^2R^3R^4)PB(R^1R^2R^3R^4)$ wherein $R^1$, $R^2$, $R^3$ and $R^4$ are as defined for formulae (1) above; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxide; and zirconium compounds, such as zirconium acetate, zirconium oxide, zirconium alkoxide, zirconium aryloxide and zirconium acetylacetone; ammonium hydroxides having an alkyl group, an aryl group or an alkyl aryl group, such as tetramethylammonium hydroxide, tetraethylammonium hydroxide, tetrabutylammonium hydroxide, trimethylbenzylammonium hydroxide; tertiary amines, such as trimethylamine, triethylamine, dimethylbenzylamine, triphenylamine; secondary amines, such as dimethylamine, diethylamine, diphenylamine, ethylphenylamine; primary amines, such as methylamine, ethylamine, phenylamine and toluylamine; imidazoles, such as 2-methylimidazole and 2-phenylimidazole.

These catalysts can be used individually or in combination. Among the above-mentioned catalysts, alkali metal salts, alkaline earth metal salts, nitrogen-containing compounds (e.g., ammonium hydroxides) and boron compounds are preferably used individually or in combination. The amount of the catalyst used is generally from $10^{-8}$ to 1 part by weight, preferably from $10^{-7}$ to $10^{-2}$ part by weight, especially preferably from $10^{-6}$ to $10^{-4}$ part by weight, relative to 100 parts by weight of the aromatic dihydroxy compound.

After the mixing step in the method of the present invention, the resultant mixture of the aromatic dihydroxy compound and the diaryl carbonate is subjected to molten state polymerization in the presence of a catalyst. For the polymerization reaction, there can be used any types of conventional reactors for producing a polycarbonate. Examples of reactors include an agitation type reactor vessel; a wiped film type reactor; a centrifugal wiped film evaporation type reactor; a surface-renewal type twin-screw kneading reactor; a twin-screw horizontal agitation type reactor; a wall-wetting fall rector; a free-fall polymerizer having a perforated plate; and a wire-wetting fall reactor having a perforated plate and at least one wire provided in association with the perforated plate (see, for example, GB 1,007,302, U.S. Pat. No. 3,888,826, Unexamined Japanese Patent Application Laid-Open Specification No. Hei 2-153923, Examined Japanese Patent Application Publication No. Sho 50-19600, Examined Japanese Patent Application Publication No. Sho 52-36159, Examined Japanese Patent Application Publication No. Sho 48-8355 and U.S. Pat. No. 5,589,564). There is no particular limitation with respect to the material used for producing the reactor; however, a material having an iron content of 20% by weight or more is preferably used, and SUS304, SUS316 and SUS316L are especially preferably used. On the other hand, for the purpose of preventing discoloration of the produced aromatic polycarbonate, a material having an iron content of 20% by weight or less may be used, or nonferrous metal materials, such as nickel and titanium, may be used.

After the mixing step, the polymerization step can be performed in any of the batchwise manner and the continuous manner.

The polymerization step is generally performed at a temperature of from 100 to 350° C., preferably from 150 to 290° C. It is especially preferred that the polymerization step is performed at a temperature of from 180 to 280° C. As the reaction proceeds, an aromatic monohydroxy compound is by-produced. By removing the aromatic monohydroxy compound from the reaction system, the reaction rate can be increased. Therefore, in the method of the present invention, it is preferred to employ a method in which an inert gas which does not adversely affect the reaction, such as nitrogen gas, argon gas, helium gas, carbon dioxide gas or a lower hydrocarbon gas, is introduced so as to remove the byproduced aromatic monohydroxy compound in such a form as entrained by the inert gas; or a method in which the reaction is carried out under reduced pressure. A suitable reaction pressure is selected depending on the molecular weight of the aromatic polycarbonate in the reaction system. In the early stage of the polymerization, it is preferred that the polymerization reaction is performed under a pressure in the range of from 10 Torr to atmospheric pressure. In the late stage of the polymerization, it is preferred that the polymerization reaction is performed under a pressure of 20 Torr or less, especially 10 Torr or less, more preferably 2 Torr or less.

The number average molecular weight of the aromatic polycarbonate obtained by the method of the present invention is generally in the range of from 5,000 to 100,000, preferably from 5,000 to 30,000.

Aromatic polycarbonates having different molecular weights can be produced by changing the polymerization conditions, such as temperature, pressure and residence time. Further, the above-mentioned aromatic dihydroxy compound, a polycarbonate prepolymer having a terminal hydroxyl group (a polycarbonate having a low polymerization degree), the above-mentioned diaryl carbonate, a polycarbonate prepolymer having a terminal aryl carbonate group, or a conventional terminal modulator, such as a monofunctional phenolic compound (e.g., t-butylphenol or t-octylphenol) can be added to the reaction system in the polymerization step, to thereby obtain aromatic polycarbonates having various terminal hydroxyl group ratios or various terminal structures.

In addition, aromatic polycarbonates having different types or ratios of recurring units can be produced by adding the above-mentioned aromatic dihydroxy compound or a polymer thereof, or a compound having hydroxyl groups or carboxyl groups at both terminals thereof, to the reaction system in the polymerization step.

A catalyst deactivator may be added to the aromatic polycarbonate obtained by the method of the present invention.

Any conventional catalyst deactivator can be used effectively as a catalyst deactivator in the present invention, but sulfonic acid ammonium salts and sulfonic acid phosphonium salts are preferred. More preferred are dodecylbenzenesulfonic acid ammonium salts and dodecylbenzenesulfonic acid phosphonium salts, such as tetrabutylphosphonium dodecylbenzenesulfonate; and p-toluenesulfonic acid ammonium salts and p-toluenesulfonic acid phosphonium salts, such as tetrabutylammonium p-toluenesulfonate. Further, as a catalyst deactivator, there can be preferably used sulfonic acid esters, such as methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and phenyl p-toluenesulfonate. Among the above-mentioned compounds, tetrabutylphosphonium dodecylbenzenesulfonate is most preferred in the present invention.

The catalyst deactivator can be used in an amount of 0.5 to 50 moles, preferably 0.5 to 10 moles, more preferably 0.8 to 5 moles per mole of the polymerization catalyst.

In the present invention, other resins, such as ABS or PET, and any of various additives, such as a stabilizer, an antioxidant, an ultraviolet absorber, a mold release agent, a colorant and a flame retardant, may be added to the aromatic polycarbonate to thereby obtain a polycarbonate composition suitable for various uses.

Further, various aromatic polycarbonates can be produced by using the above-mentioned resins and additives in combination.

Examples of heat stabilizers or antioxidants include phosphorus-containing compounds, phenolic compounds, organic thioether type compounds and hindered amine type compounds. Examples of light stabilizers or ultraviolet absorbers include a salicylic acid type compound, a benzophenone type compound, a benzotriazole type compound and a cyanoacrylate type compound.

As a mold release agent, any conventional mold release agents can be used in the present invention. For example, there can be mentioned hydrocarbons, such as paraffin; fatty acids, such as stearic acid; fatty acid amides, such as stearic acid amide; alcohols, such as stearyl alcohol and pentaerythritol; fatty acid esters, such as glycerol monostearate; and silicone compounds, such as silicone oil.

Organic and inorganic pigments and dyes can be used as colorants.

In addition to the above-mentioned additives, any of a metal deactivator, an antistatic agent, a lubricant and a nucleating agent can be used depending on the desired properties of the aromatic polycarbonate.

These additives can be used in combination.

The additives can be added to the molten aromatic polycarbonate either directly in a solid form or in the form of a solution or dispersion in an appropriate solvent or a molten polymer. Alternatively, additives may be used in the form of a master pellet, wherein the master pellet is added to a molten aromatic polycarbonate, followed by kneading. There is no particular limitation with respect to the apparatus used for performing the above-mentioned operations, but, for example, a twin-screw extruder is preferred. When the additives are added in the form of a solution, there can be used a dispensing pump, such as a plunger pump. When the additives are added in the form of a master pellet, a side feeder is generally used. When the additives are used after dissolved in a solvent or after dispersed in a dispersion medium, it is especially preferred to use a twin screw extruder having a vent.

EXAMPLES

Hereinbelow, the present invention will be explained in more detail with reference to the following Example and Comparative Examples.

The number average molecular weight (hereinafter, abbreviated to "Mn") of an aromatic polycarbonate is measured by gel permeation chromatography (GPC) (solvent: tetrahydrofuran, column: polystyrene gel), utilizing a molecular weight conversion calibration curve obtained with respect to the standard mono-disperse polystyrene samples, wherein the molecular weight conversion calibration curve is represented by the following formula:

$$M_{PC}=0.3591M_{PS}^{1.0388}$$

wherein $M_{PC}$ represents the molecular weight of the aromatic polycarbonate and $M_{PS}$ represents the molecular weight of the standard polystyrene.

The terminal hydroxyl group ratio of an aromatic polycarbonate is measured as follows. 0.3 g of an aromatic polycarbonate is dissolved in 5 ml of deuterated chloroform to obtain a sample. The obtained sample is subjected to $^1$H-NMR at 23° C. by using NMR appartus EX-400 (manufactured and sold by JEOL Ltd., Japan) to determine the amount of terminal hydroxyl groups of the aromatic polycarbonate. The terminal hydroxyl group ratio (mol %) is calculated as the amount of terminal hydroxyl groups, relative to the amount of all terminal groups.

A schematic diagram of a system used in the Example and the Comparative Examples is shown in FIG. 1.

In the system shown in FIG. 1, raw materials 1 (i.e., an aromatic dihydroxy compound and a diaryl carbonate) and a catalyst are fed into mixing vessel 2 and mixed therein to thereby obtain a mixture. The mixing of the raw materials and the catalyst is performed in a batchwise manner. The obtained mixture is introduced into first agitation type polymerizer 3 and, then, second agitation type polymerizer 4 to perform a polymerization reaction. Subsequently, the resultant reaction mixture is introduced into first wire-wetting fall polymerizer 5 and, then, second wire-wetting fall polymerizer 6 to further effect the polymerization reaction until the molecular weight of the produced aromatic polycarbonate reaches a desired level. The resultant aromatic polycarbonate having a desired molecular weight is withdrawn from second wire-wetting fall polymerizer 6. The polymerization reactions performed in first agitation type polymerizer 3 and the polymerizers positioned downstream of polymerizer 3 are in a continuous manner.

First agitation type polymerizer 3 and second agitation type polymerizer 4 are used to perform agitation polymerization. First agitation type polymerizer 3 is operated so as to maintain the volume of the reaction mixture contained therein at 40 liters, and second agitation type polymerizer 4 is operated so as to maintain the volume of the reaction mixture contained therein at 20 liters. First wire-wetting fall polymerizer 5 is a polymerizer equipped with a perforated plate and a wire as a guide, wherein the perforated plate has 20 holes (diameter: 5 mm), each hole having an SUS wire (diameter: 2 mm) extending downwardly through the center of the hole to the bottom of the polymerizer where the reaction mixture is collected. In this polymerizer, the reaction mixture is allowed to fall for 8 m. Second wire-wetting fall polymerizer 6 is substantially the same as first wire-wetting fall polymerizer 5 except that the perforated plate has 50 holes.

When the amount of the reaction mixture (molten polymer) collected at the bottom of first wirewetting fall polymerizer 5 reaches 20 liters, a part of the reaction mixture is continuously transferred to second wire-wetting fall polymerizer 6 so that the amount of the reaction mixture at the bottom of first wire-wetting fall polymerizer 5 is maintained at 20 liters. When the amount of the molten polymer collected at the bottom of second wire-wetting fall polymerizer 6 reaches 20 liters, a part of the collected molten polymer is continuously withdrawn from second wire-wetting fall polymerizer 6 so that the amount of the molten polymer at the bottom of the polymerizer 6 is maintained at 20 liters.

The polymerization reactions are performed under the following conditions.

First agitation type polymerizer 3 is operated at a reaction temperature of 235° C. and under a reaction pressure of 98 Torr.

Second agitation type polymerizer 4 is operated at a reaction temperature of 252° C. and under a reaction pressure of 6 Torr.

First wire-wetting fall polymerizer 5 is operated at a reaction temperature of 270° C. and under a reaction pressure of 3 Torr.

Second wire-wetting fall polymerizer 6 is operated at a reaction temperature of 272° C. and under a reaction pressure of 0.8 Torr.

Bisphenol A and diphenyl carbonate are used as an aromatic dihydroxy compound and a diaryl carbonate, respectively. Both of these compounds are individually subjected to vacuum degassing under 50 Torr, followed by an inert gas treatment in which the compound is subjected to purging with nitrogen gas having an oxygen content of 0.5 ppm. A cycle of the vacuum degassing and the inert gas treatment was performed 5 times. Diphenyl carbonate was approximately weighed using Micro Motion Massflow meter (manufactured and sold by Emerson Japan, Ltd., Japan) and, then, accurately weighed using a load cell weight indicator (lowfloor type pan scale) manufactured and sold by Kubota Corporation, Japan. The accuracy in weighing of the Micro Motion Massflow meter was ±0.2% or less and that of the load cell weight indicator was ±0.05% or less. The weight of bisphenol A was measured together with a hopper and the measured bisphenol A was fed into the mixing vessel.

Example 1

Into a mixing vessel having its temperature preset at 140° C. was introduced nitrogen gas having an oxygen concentration of 0.5 ppm, thereby slightly increasing the internal pressure of the vessel to a level 50 Torr higher than atmospheric pressure. 40.81 kg of diphenyl carbonate powder was charged into the mixing vessel and melted. Further, 7 mg of sodium hydroxide and 39.19 kg of bisphenol A powder were added to the mixing vessel in this order. The molar ratio of the diphenyl carbonate to the bisphenol A was 1.11. The above-mentioned addition of bisphenol A to the mixing vessel containing a mixture of the molten diphenyl carbonate and sodium hydroxide was performed over about 1.5 hours, and was followed by agitation of the resultant mixture in the vessel for 5.5 hours, to thereby thoroughly dissolve the bisphenol A.

As a result, a polymerization reaction proceeded, and there was obtained a molten prepolymer as a reaction mixture. It was found that the conversion of bisphenol A was about 30%.

The thus prepared molten prepolymer was transferred to a first agitation type reaction vessel at a rate of 20 kg/hr and subjected to further polymerization reaction.

The above-described procedure using the mixing vessel and the first agitation type reaction vessel was performed five times in total, wherein the mixing step was performed in which the molar ratio of diphenyl carbonate to bisphenol A had a tolerable variation in the range of ±0.005, thereby obtaining five aromatic polycarbonates. Then, a comparison was made between the thus obtained aromatic polycarbonates with respect to the variation in both the molecular weight and terminal hydroxyl group ratio of polymer and to the degree of discoloration of polymer.

As a result, it was found that each of the aromatic polycarbonates had a molecular weight in the range of 12,400±400 and a terminal hydroxyl group ratio in the range of 17%±1%.

Further, the aromatic polycarbonates exhibited no discoloration. Thus, aromatic polycarbonates having excellent properties were obtained stably.

Comparative Example 1

Aromatic polycarbonates were produced in substantially the same manner as in Example 1 except that the mixing step was performed as follows. First, bisphenol A powder was charged into the mixing vessel. Then, sodium hydroxide was added to the mixing vessel, followed by addition of diphenyl carbonate in a molten state.

As a result, it was found that each of the aromatic polycarbonates produced had a terminal hydroxyl group ratio in the range of 17%±2%. Further, the aromatic polycarbonates were visually observed to find that they were discolored to assume a slight brown color.

Comparative Example 2

Aromatic polycarbonates were produced in substantially the same manner as in Comparative Example 1 except that, in the mixing step, the molar ratio of diphenyl carbonate to bisphenol A was changed to exhibit a variation in the range of ±0.02, thereby obtaining five aromatic polycarbonates. As a result, it was found that each of the aromatic polycarbonates had a molecular weight in the range of 12,600±900 and a terminal hydroxyl group ratio in the range of 16%±5%. The aromatic polycarbonates exhibited no discoloration.

Comparative Example 3

Aromatic polycarbonates were produced in substantially the same manner as in Comparative Example 1 except that nitrogen gas having an oxygen concentration of 100 ppm was used for the treatment of bisphenol A and diphenyl carbonate and for the purging of the mixing vessel before performing the mixing step. As a result, it was found that the aromatic polycarbonates produced were discolored to assume a reddish brown color.

INDUSTIAL APPLICABILITY

By the method of the present invention, a high quality aromatic polycarbonate can be efficiently produced, wherein the aromatic polycarbonate exhibits no discoloration and has only a small variation of both the terminal hydroxyl group ratio and the molecular weight.

The invention claimed is:

1. A method for producing a high quality aromatic polycarbonate having a number average molecular weight of from 5,000 to 100,000, which is free from discoloration and exhibits both (1) a small variation in molecular weight and (2) a small variation of ∓1% in terminal hydroxyl group ratio; which method comprises subjecting to molten state polymerization a mixture of an aromatic dihydroxy compound and a diaryl carbonate in the presence of a catalyst, said mixture of the aromatic dihydroxy compound and the diaryl carbonate being obtained by a mixing step in which an aromatic dihydroxy compound and a catalyst, each being in at least one state selected from the group consisting of a solid state and a liquid state, are added to a diaryl carbonate in a molten state in the presence of an inert gas, wherein said inert gas has an oxygen concentration of not more than 10 ppm, thereby dissolving said aromatic dihydroxy compound and said catalyst in said molten diaryl carbonate, wherein said mixing step is performed at a temperature of from 80 to 250° C. in which the molar ratio of the diaryl carbonate to the aromatic dihydroxy compound is in the range of from 1.05 to 1.20, wherein the molar ratio has a tolerable variation in the range of ±0.005, wherein the mixing in said mixing step is accompanied by a transesterification reaction between said aromatic dihydroxy compound and said diaryl carbonate, wherein the conversion of the aromatic dihydroxy compound is from 10 to 80%, and wherein, before said mixing step, said aromatic dihydroxy compound is treated with an inert gas having an oxygen concentration of not more than 10 ppm.

* * * * *